Sept. 23, 1969   J. C. SCHOTTMILLER ET AL   3,468,705
METHOD OF PREPARING LEAD OXIDE FILMS
Filed Nov. 26, 1965
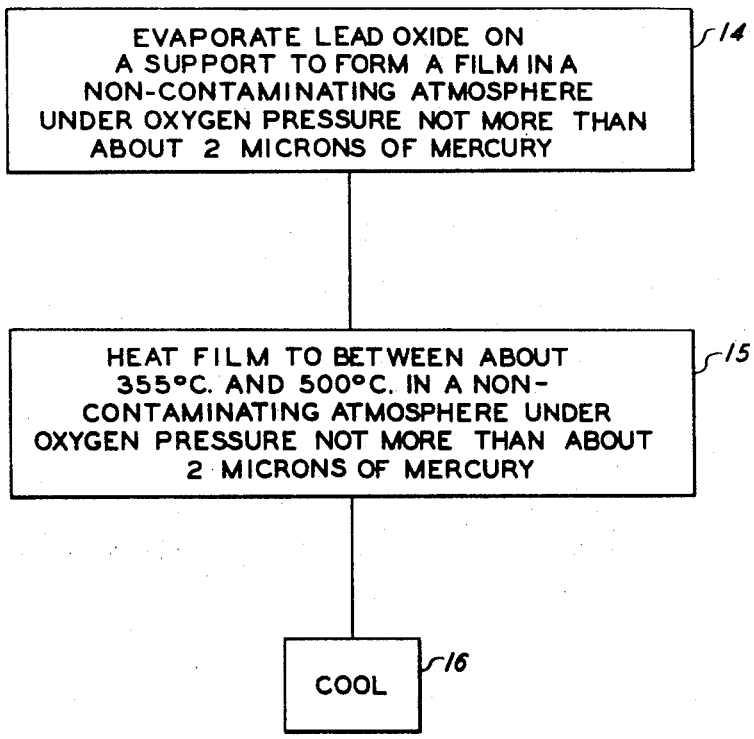
INVENTORS
JOHN C. SCHOTTMILLER
RAY C. WALBORN JR.

United States Patent Office 3,468,705
Patented Sept. 23, 1969

3,468,705
METHOD OF PREPARING LEAD OXIDE FILMS
John C. Schottmiller, Penfield, N.Y., and Ray C. Walborn, Jr., Sanford, Fla., assignors to Xerox Corporation, Rochester, N.Y., a corporation of New York
Filed Nov. 26, 1965, Ser. No. 509,968
Int. Cl. C23c *13/00;* B44d *1/00*
U.S. Cl. 117—201                                    11 Claims

ABSTRACT OF THE DISCLOSURE

A method of forming a lead oxide film on a support which comprises evaporating onto the support a film of tetragonal lead oxide, followed by heating the film to a temperature between about 355° C. and 500° C. to transform substantially all of the film to the orthorhombic form of lead oxide, with the evaporation and/or heating being carried out at an oxygen pressure which does not exceed the decomposition pressure of lead oxide.

This invention relates to a method of making lead oxide films.

It is known in the art that two polymorphic forms of lead oxide, the "red" tetragonal form and the "yellow" orthorhombic form are suitable photoconductive insulating materials usable, for example, in the process of electrostatography as exemplified by the process of xerography, for example, as disclosed in Carlson Patent No. 2,297,691, issued Oct. 6, 1942. Lead oxide films are also usable in camera tubes as described in Patent No. 2,888,370, issued May 26, 1959, and have other uses well known to those skilled in the art.

Each of the tetragonal and the orthorhombic forms has specific properties useful in differing applications as a photoconductive insulating material. For example, the "red" tetragonal form has a broader spectral response but a lower resistivity while the "yellow" orthorhombic form has a higher resistivity but a lesser photoresponse at longer wavelengths.

Although suitably prepared films or plates of each of the polymorphic forms of lead oxide have utility as photoconductive insulating materials, to date there has been no completely satisfactory way of preparing films of the orthorhombic form of lead oxide separate from the tetragonal form.

Vacuum evaporation has been reported to produce a mixture of the two forms which tends to produce films with varying sensitivity characteristics. It is also known in the art that heat treatment of a mixture of the two polymorphic forms to a temperature above the transition temperature, which has been found to be about 489° C., where the tetragonal phase begins to convert to the orthorhombic phase, has been known to transform the tetragonal form to the orthorhombic form. But this technique has a number of serious drawbacks.

To effect complete conversion or nearly complete conversion to the orthorhombic form by the above method, it has been found necessary, for example as taught in U.S. Patent No. 2,888,370, issued May 26, 1959, to go considerably above the transition temperature to a temperature in the range of from 525° C. to something less than 888° C., the melting point of lead oxide. In some cases, as long as two hours at such high temperature has been required to effect substantially complete conversion. These very high temperatures and long heating times, of course, require more protective apparatus and more power to cause conversion than, for example, a process which could cause a conversion at lower temperatures applied for a shorter time.

Also, the high conversion temperatures taught by the prior art severely limit the range of support materials which may be used to receive the film and which may subsequently be used as a composite with the film to form a photoconductive plate. For use as a photoconductive plate an electrically conductive substrate such as most metals or materials such as conductive glasses are desirable support materials. But some metals and many otherwise suitable conductive glasses have been found to be undesirable as support materials because the high conversion temperatures, required by the prior art to effect substantially complete conversion to the orthorhombic form, caused undesirable phase changes or softening or melting or caused the support material to react with the film of evaporant.

Moreover, in cooling the support material and the film of converted orthorhombic lead oxide from the high conversion temperatures required by the prior art, it was found that partial reversion to the tetragonal form would occur if rather exacting cooling procedures were not employed.

Thus, it is an object of the present invention to provide a method of preparing orthorhombic lead oxide films devoid of the above-noted disadvantages.

A further object of the invention is to provide a method for preparing orthorhombic lead oxide films utilizing lower temperatures applied for shorter times than the temperatures and times required by prior art processes.

A still further object of the invention is to provide a method for preparing orthorhombic lead oxide films utilizing a wider range of support materials than was heretofore possible in the art.

A still further object of the invention is to provide a method for preparing orthorhombic lead oxide films by a simpler and more economical process than any process heretofore known in the art.

The above and still further objectives of the invention are achieved in accordance with this invention by providing a method of evaporating lead oxide in an uncontaminating atmosphere to form a film of evaporant on a substrate and then heating said film of evaporant to a temperature between about 355° C. and 500° C. in an uncontaminating atmosphere wherein evaporating or heating or both is done in a pressure below the decomposition pressure of lead oxide, generally not more than about 2 microns of mercury, to transform substantially all of said film of evaporant to the orthorhombic form of lead oxide.

For a better understanding of the invention as well as other objects and further features thereof, reference is made to the following detailed description of a preferred method for preparing an orthorhombic lead oxide film in accordance with the present invention to be read in connection with the accompanying drawings.

FIG. 1 is a diagrammatical cross sectional view of a coating of lead oxide of the orthorhombic form on a suitable support material.

FIG. 2 is a flow diagram illustrating a preferred method for coating lead oxide film on a support in accordance with the present invention.

In FIG. 1 the film 11 is obtained in the preferred manner illustrated in the flow diagram of FIG. 2 by evaporating in step 14 lead oxide to form a film of evaporant on a support where the evaporation takes place in a noncontaminating atmosphere of oxygen pressure not more than about 2 microns of mercury, and then heating the film in step 15 to between 355° C. and 500° C. in a noncontaminating atmosphere of oxygen pressure not more than about 2 microns of mercury, and cooling in step 16 the film and support.

For example, according to the above teaching 35 grams of lead oxide powder were evaporated from a platinum boat in a conventional bell jar system in an oxygen atmosphere at a pressure of 0.1 to 1.0 micron. The evaporant was condensed on a tin oxide coated Pyrex glass substrate held at a temperature of 200° C. at a distance of 6 inches above the boat. A dark colored film about 30 microns thick was obtained. The film of evaporant was then heated to 440° C. for about 5 minutes in an oxygen atmosphere of pressure of 0.8 micron to transform substantially all of the film of dark material to lead oxide of the yellow orthorhombic form. The films prepared in this manner had a typical analysis, by X-ray diffraction, of greater than 97% orthorhombic lead oxide.

The support material temperature during the evaporation step 14 was not found to be a requirement of the invention, although the support material was usually held at a fixed temperature of 125° C. or 200° C. and generally kept below the temperature which would cause the substrate to react adversely with the film of evaporant or would cause the substrate to soften or melt.

In the prior art it was taught that it was necessary during the evaporating and heating steps to keep the pressure above the decomposition pressure of lead oxide, while in this invention it is thought that some decomposition due to a pressure or partial pressure of oxygen generally less than about 2 microns of mercury during either or both of the evaporating and heating steps is desirable to achieve the lower conversion temperatures in the process of this invention.

The film of evaporant, if evaporation took place below an oxygen pressure of 2 microns as specified herein, was usually found to be a dark material displaying the X-ray diffraction pattern of the tetragonal form of lead oxide. However, it is postulated that the dark colored evaporant is a lead oxide deviant from stoichiometry in the direction of an oxygen deficiency or lead excess over the conventional makeup of lead oxide, PbO. This variation from stoichiometry is taught to be caused by the evaporation taking place in a sufficiently low pressure as to cause a decomposition of the lead oxide or a leaking off of lead oxide oxygen to the evaporating atmosphere. Thus, an unusual evaporant is obtained with an apparently lower transition temperature which will, when heated at surprisingly low temperatures for a surprisingly short time, substantially completely convert to orthorhombic lead oxide.

Alternatively, one may evaporate at relatively high oxygen pressures, for example, above 2 microns of mercury, followed by a heat treatment at pressures generally not more than 2 microns of mercury to induce oxygen deficiency-lead excess in the heating step and converting to the orthorhombic form.

In the conversion step 15 it was generally found that heating the deposited film of evaporant in the temperature range between about 355° C. and 500° C. for a duration of about 5 minutes caused substantially complete conversion of the film to lead oxide of the orthorhombic form.

In order to adapt the orthorhombic film for use as a photoconductive element, ordinarily the film and the support will be cooled to room temperature, although it was found that no pains need be taken in the cooling step 16 as was necessary in the prior art to prevent a partial reversion to the tetragonal form. Generally, cooling at room temperature such as between 50° F. and 85° F. was found to be satisfactory.

It is also noted that although in the example given an oxygen atmosphere was used as the low pressure atmosphere, any atmosphere may be used which does not unduly contaminate the film of evaporant and thus diminish the purity of the final film of orthorhombic lead oxide. Depending on the final use to which the film is to be put various amounts of contamination of the final film would be allowable thus effecting the choice of a proper evaporating atmosphere. If no contamination from the atmosphere is desirable, then an oxygen atmosphere or atmosphere of another gas which would not react with the heated lead or lead oxide would be a desirable atmosphere. Also, for example, oxygen at a low partial pressure combined with another non-contaminating gas, for example argon, at a much higher partial pressure would provide a suitable non-contaminating atmosphere wherein the partial pressure of the oxygen could be kept less than about 2 microns of mercury to produce the orthorhombic form of lead oxide by the process hereof. If some contamination was allowable, then ordinary air might be used or another gas which would react somewhat with the lead or lead oxide at the temperatures of this invention but would not contaminate the film to an undesirable degree.

The thickness of the film of evaporant and of the subsequent layer of orthorhombic lead oxide is determined by the time allowed the evaporation step 14.

Thus, by this improved method of forming orthorhombic lead oxide films by evaporating lead oxide and subsequently heat treating the film of evaporant at temperatures between 355° C. and 500° C. wherein evaporating or heating or both are done in a low oxygen pressure to form an orthorhombic lead oxide film there is provided a process wherein the evaporant is heat treated at lower temperatures for a shorter time and which allows evaporating onto a wider range of support materials by a simpler and more economical process than was heretofore known in the art.

Although the invention has been described in detail and by example, it is intended and will be understood that the forgoing is for illustration and not limitation and that those skilled in the art upon reading the foregoing discussion will conceive of other applications and variations of this invention encompassed within the scope of the present invention.

What is claimed is:

1. A method of forming a lead oxide film on a support member, which comprises evaporating a film of lead oxide in the tetragonal form onto said support member, heating said film at a temperature between about 355° C. and 500° C. to transform substantially all of said film to the orthorhombic form of lead oxide, wherein at least one of said evaporation and heating steps is carried out in a low oxygen pressure below the decomposition pressure of lead oxide.

2. The method according to claim 1 wherein said evaporating is done in an atmosphere wherein the pressure of oxygen does not exceed about 2 microns of mercury for a time sufficient to produce a stoichiometric excess of lead and deficiency of oxygen in said film.

3. The method according to claim 1 wherein said heating is done in an atmosphere wherein the pressure of oxygen during said heating does not exceed about 2 microns of mercury for at least a time sufficient to produce a stoichiometric excess of lead and deficiency of oxygen in said film.

4. The method according to claim 1 wherein said evaporating and said heating are done in an atmosphere wherein the pressure of oxygen does not exceed about 2 microns of mercury for a time sufficient to produce a stoichiometric excess of lead and deficiency of oxygen in said film.

5. The method according to claim 1 wherein said evaporating is done in an atmosphere wherein the pressure of oxygen does not exceed the decomposition pressure of lead oxide.

6. The method according to claim 1 wherein said heating is done in an atmosphere wherein the pressure of oxygen does not exceed the decomposition pressure of lead oxide.

7. The method according to claim 1 wherein said evaporating and said heating are done in an atmosphere wherein the pressure of oxygen does not exceed the decomposition pressure of lead oxide.

8. The method of forming a lead oxide film on a support member, comprising:

(a) evaporating onto said support member a tetragonal lead oxide film having a stoichiometric excess of lead and deficiency of oxygen, and
(b) heating said film to transform substantially all of said film to the orthorhombic form of lead oxide.

9. The method of forming a lead oxide film on a support member, comprising:
    (a) evaporating a tetragonal lead oxide film on said support member, and
    (b) heating said film to induce a stoichiometric excess of lead and deficiency of oxygen and to transform substantially all of said film to the orthorhombic form of lead oxide.

10. The method of claim 8 wherein said heating is done at a temperature between about 355° C. and 500° C.

11. The method of claim 9 wherein said heating is done at a temperature between about 355° C. and 500° C.

References Cited

UNITED STATES PATENTS

| | | | |
|---|---|---|---|
| 2,888,370 | 5/1959 | Damon et al. | 117—201 |
| 3,266,932 | 8/1966 | Anolick | 117—201 |
| 3,307,983 | 3/1967 | De Haan et al. | 117—200 |

WILLIAM L. JARVIS, Primary Examiner

U.S. Cl. X.R.

96—1; 117—106